(12) United States Patent
Parikh et al.

(10) Patent No.: US 11,930,430 B2
(45) Date of Patent: Mar. 12, 2024

(54) SPECIALIZED WIRELESS NETWORK ARRANGEMENTS FOR INDUSTRIAL APPLICATIONS

(71) Applicant: Doodle Labs (SG) PTE LTD, Somerset, NJ (US)

(72) Inventors: Nimesh D. Parikh, Mattawang, NJ (US); Claus Muschallik, Singapore (SG); Meng Huan Gan, Singapore (SG); Aaron Vinh Thanh Do, Singapore (SG); Sameer Garg, Singapore (SG); Simon Wunderlich, Thossfell (DE)

(73) Assignee: Doodle Labs (SG) PTE LTD., Somerset, NJ (US)

(*) Notice: Subject to any disclaimer, the term of this patent is extended or adjusted under 35 U.S.C. 154(b) by 626 days.

(21) Appl. No.: 17/261,088

(22) PCT Filed: Jul. 18, 2019

(86) PCT No.: PCT/US2019/042339
§ 371 (c)(1),
(2) Date: Jan. 18, 2021

(87) PCT Pub. No.: WO2020/018748
PCT Pub. Date: Jan. 23, 2020

(65) Prior Publication Data
US 2021/0306820 A1    Sep. 30, 2021

Related U.S. Application Data

(60) Provisional application No. 62/701,202, filed on Jul. 20, 2018.

(51) Int. Cl.
*H04W 4/38* (2018.01)
*H04B 1/00* (2006.01)
(Continued)

(52) U.S. Cl.
CPC ............ *H04W 4/38* (2018.02); *H04B 1/0003* (2013.01); *H04B 7/0413* (2013.01); *H04W 84/12* (2013.01)

(58) Field of Classification Search
CPC ........... H04W 4/38; H04W 4/40; H04W 4/50; H04W 84/12
See application file for complete search history.

(56) References Cited

U.S. PATENT DOCUMENTS 8,527,855 B2   9/2013  Ghosh
8,547,904 B2   10/2013 Valbonesi
(Continued)

OTHER PUBLICATIONS

Chandhar, Prabhu et al., "Massive MIMO for Connectivity with Drones: Case Studies and Future Directions", Arxiv. Org, Cornell University Library, 201 Olin Library, Cornell University, Ithaca NY, Nov. 21, 2017, pp. 1-14.
(Continued)

*Primary Examiner* — Jamal Javaid
(74) *Attorney, Agent, or Firm* — Wendy W. Koba (57) ABSTRACT

An application-specific wireless communication network for use in an industrial environment based on parameters defined by the IEEE 802.11 standard, modified by providing software-defined control of an assigned operating frequency band and software-defined control of the channel size, allowing the channel size to be relatively small as appropriate for the particular industrial application. The application-specific wireless communication network further controls other parameters defined by the standard to configure at least optimum transmitter power, receiver sensitivity, transmission latency, and ACK-retransmit to values appropriate for the specific industrial application.

24 Claims, 6 Drawing Sheets

(51) Int. Cl.
*H04B 7/0413* (2017.01)
*H04W 84/12* (2009.01)

(56) References Cited

U.S. PATENT DOCUMENTS

| | | | |
|---|---|---|---|
| 8,982,831 | B2 | 3/2015 | Crowle et al. |
| 9,048,994 | B2 | 6/2015 | Porat |
| 9,544,904 | B2 | 1/2017 | Barriac et al. |
| 9,680,415 | B2 | 6/2017 | Anderson et al. |
| 9,867,185 | B1 | 1/2018 | Zhang et al. |
| 9,948,237 | B2 | 4/2018 | Anderson et al. |
| 10,075,998 | B2 | 9/2018 | Azizi et al. |
| 10,321,350 | B2 | 6/2019 | Sullivan et al. |
| 2008/0062919 | A1 | 3/2008 | Chen et al. |
| 2017/0048905 | A1* | 2/2017 | Yun ............... H04W 76/14 |
| 2017/0181102 | A1* | 6/2017 | Bharadwaj ......... H04W 52/242 |
| 2017/0187636 | A1 | 6/2017 | Shahar et al. |
| 2017/0201895 | A1 | 7/2017 | Hassan et al. |
| 2018/0235005 | A1 | 8/2018 | Ansari et al. |
| 2018/0248983 | A1 | 8/2018 | Mohebbi et al. |
| 2018/0331798 | A1 | 11/2018 | Nammi et al. |
| 2019/0187651 | A1 | 6/2019 | Cella et al. |

OTHER PUBLICATIONS

Yan, Shi et al., "Building UAV-based Testbeds for Autonomous Mobility and Beamforming Experimentation", 2018 IEEE International Conference on Sensing, Communication and Networking (Secon Workshops), IEEE, Jun. 11, 2018, pp. 1-5.

Bejerano, Oscar, et al., "IEEE 802.11 ac: From Channelization to Multi-User MIMO", IEEE Communications Magazine, Oct. 2013, pp. 84-90.

Sherman, Matthew, et al., "IEEE Standards Supporting Cognitive Radio and Networks, Dynamic Spectrum Access, and Coexistence", IEEE Communications Magazine, Jul. 2008, pp. 72-79.

Hu, Peng, "A System Architecture for Software-Defined Industrial Internet of Things", IEEE ICUWB—2015, Jul. 31, 2015, pp. 1-5.

* cited by examiner

SPECIALIZED WIRELESS NETWORK ARRANGEMENTS FOR INDUSTRIAL APPLICATIONS

CROSS-REFERENCE TO RELATED APPLICATIONS

This application claims the benefit of U.S. Provisional Application No. 62/701,202, filed Jul. 20, 2018 and herein incorporated by reference.

TECHNICAL FIELD

The present invention relates to specialized wireless communication arrangements well-suited for industrial applications and, more particularly, to application-specific, software-defined operating parameters for modifying a standard of the Institute of Electrical and Electronics Engineers (IEEE) 802.11 protocol to address the needs of a particular environment.

BACKGROUND OF THE INVENTION

Figure 1:
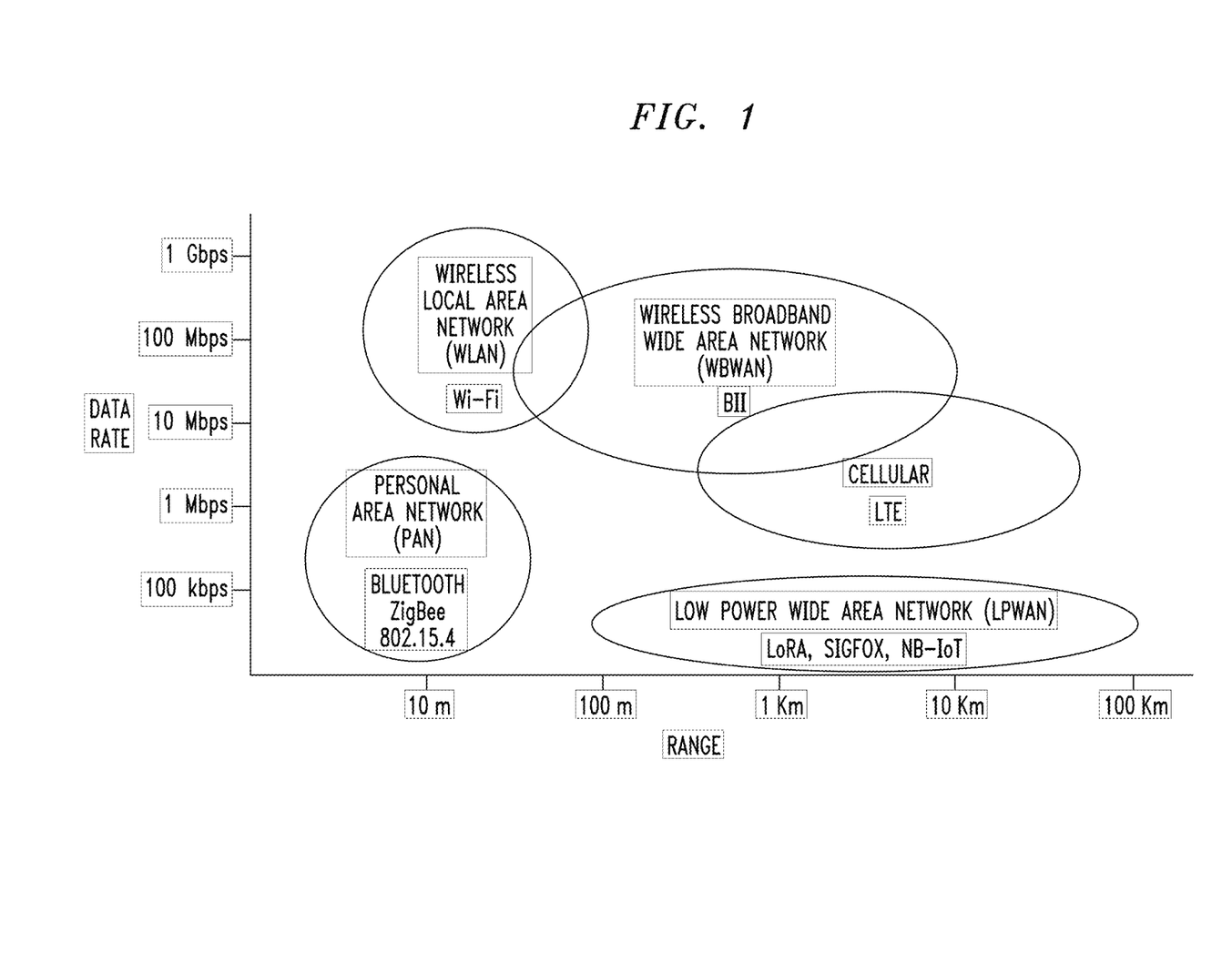
FIG. 1 is a depiction of various wireless communication service offerings, plotted as a function of data rage versus signal range.

There is a diverse set of needs for optimum wireless connectivity. Many technologies have been developed to optimize a specific set of criteria (e.g., range, power, speed). FIG. 1 illustrates an exemplary, preferred utilization for each of the major wireless technologies. It is relatively straightforward to understand that each wireless device/application will have its own requirements in terms of data throughput, latency, range, mobility, power, etc. Clearly, no single technology can satisfy all of the different use cases.

In reviewing FIG. 1, it is clear that ubiquitous Wi-Fi (based on the IEEE 802.11 standard) is the uncontested choice for the license-free, high-speed wireless LAN (WLAN) category. Bluetooth and some variants of IEEE 802.15.4 are being considered for short-range, low data rate applications, while LoRA, SIGFOX and NB-IOT are discussed as contenders for the extremely long-range, low-power, low-throughput sensor connectivity applications. A current area of research and development is associated with the various wireless connectivity options for the Industrial Internet of Things (IIoT). While the subject of various definitions, the "Internet of Things" (IoT) is associated in general with the proposition that one "smart" device is able to communicate with another "smart" device without human interference (i.e., machine-to-machine (M2M)). Smart objects are increasingly able to tailor their response to their current environment, regardless of how complex the environment may be. The "Industrial" IoT (IIoT) is considered to be a specialized, yet prolific, portion of the IoT that is focused on M2M in manufacturing/industry environments where sensors, computers, and smart devices need to work together. The LTE and 5G public networks are increasingly considered as candidates for IIoT applications because of their easy access. However, these public cellular networks do not provide the necessary price-performance ratios. That is, since the public networks are by design shared among a large number of users, they exhibit relatively low speed, low QoS, and high latency, and in most cases are only available at high monthly recurring charges.

Thus, a need remains for a wireless communication architecture that addresses the diverse needs of the various applications/environments associated with IIoT.

SUMMARY OF THE INVENTION

The needs remaining in the prior art are addressed by the present invention, which relates to specialized wireless communication arrangements well-suited for industrial applications (such as IIoT) and, more particularly, to the implementation of application-specific, software-defined operating parameters provided by modifying the standard IEEE 802.11 protocol (as typically implemented for various WiFi uses) to address the needs of a particular environment.

In accordance with the principles of the present invention, it has been realized that various industrial applications for wireless communication may not be best served by the ubiquitous WiFi performance drivers of higher and higher speeds (currently extending beyond 1 Gbit rates) and relatively large-sized channels. Rather, industrial applications tend to prioritize features such as transmission range (on the order of several kms, perhaps up to 20 kms or more), communication in a noisy environment, and reliability. Thus, the present invention is particularly directed to extending the primary core IEEE 802.11 capabilities to address the specific needs of industrial applications and configuring, on a case-by-case basis, a private communication network that best meets the needs of each individual application. For example, the control of a network of rapidly moving unmanned vehicles require low latency communications between a control station and each vehicle. Highly-sensitive applications such as surveillance, public safety, and the like require specific encryption techniques to be utilized. In warehouse communication applications where there are multiple sources of interference, proper signal coding is a must. Thus, a "one-size-fits-all" wireless communication solution for all possible IIoT applications is not a viable approach.

In various embodiments of the present invention, systems and methods are implemented by utilizing relatively small channel sizes (e.g., as small as 1.25 MHz, with other contemplated channel sizes on the order of 3-5 MHz, for example) instead of the 20/40/80/160 MHz conventional channel size in the IEEE 802.11 standard, since very high throughput associated with newer WiFi systems is not a critical parameter for industrial applications. The various benefits derived from the use of small-sized channels will be discussed in detail below. Besides channel size, various embodiments of the present invention particularly define the properties of uplink and downlink channels established between a control station and an industrial device (node). "Industrial devices" including communication capabilities so as to be defined as a "node" in the communication sense include, for example, unmanned vehicles (e.g., drones, ground-based rovers), robotic devices, security devices, industrial sensors, and the like. In these cases of "industrial devices", implementing an "Ultra Reliable Low Latency Channel" (URLLC) configuration for uplink command and control communications from the control station to the individual devices is a significant priority, since the control station is used to transmit commands to these devices as deployed in the field (e.g., drones, unmanned ground vehicles, mining vehicles, etc.). Additionally, the utilization of multi-frequency mesh network architectures (including both self-healing and self-forming) further the ability to extend the communication range of industrial applications where line-of-sight transmission in a single "hop" from a base station to a given node is problematic, and also improve reliability by being able to transmit the same command/control message over different paths through the mesh network.

In preferred embodiments, the present invention utilizes a bi-directional protocol to exchange certain operational parameters between the control station and each industrial device/node. For example, recently-implemented "shared spectrum" requirements by the FCC in the United States require a provider to request "channel" and "transmit power" authorization from a centralized authority prior to beginning transmission in these particular spectra. The bi-directional protocol is utilized in the inventive configuration to allow for a control station that has obtained authorization for a given channel and transmit power to then share this information with the other nodes (industrial devices) within its private communication network (and update channel assignment and power level, as necessary). Other adjustments in additional parameters, including but not limited to the "ACK" timing window, transmit power control, channel selection, certification mode, and the like may also be individually tailored for specific industrial applications, as will be described in detail below.

Said another way, the present invention proposes an "application-specific" wireless communication system that is able to be tailored in terms of operating parameters to meet the diverse needs of different industrial applications, which is referred to at times hereafter as a "Broadband Industrial Internet" (BII) system architecture.

The BII system architecture of the present invention is contemplated as filling the gap for long range, high throughput communications. As will be described in detail below, various physical and MAC layer parameters are individually controlled in the BII architecture for each specific industrial application to achieve interference-resistant, robust, wireless broadband communication, while preserving benefits of the IEEE 802.11 standard. Additionally, by leveraging the capability to frequency shift a defined communication link to another band (via software-controlled frequency shifting, as described in our co-pending application Ser. No. 15/986, 913), interference with adjacent channels is avoided.

An exemplary embodiment of the present invention takes the form of a wireless communication system comprising a control station and at least one "industrial device" responsive to commands from the control station. The control station itself includes a communication interface for interacting with a user and a MIMO transceiver utilizing software-defined controls to provide an application-specific operating frequency band and an application-specific channel size selected for a particular industrial application. The MIMO transceiver is configured to modify selected IEEE 802.11 operating parameters to optimize performance for the particular industrial application, where a group of IEEE 802.11 operating parameters available for modification includes at least: transmission power, receiver sensitivity, network architecture, communication range and ACK timing window. A MIMO-configured antenna arrangement is included at the control station. Correspondingly, the at least one industrial device also includes a MIMO antenna configuration for proper transmission with the control station. The at least one industrial device further comprises a MIMO transceiver utilizing software-defined controls to match the characteristics of the control station MIMO transceiver, a processor responsive to signals received by the MIMO transceiver for determining commands associated with the industrial device, and a control unit (responsive to the processor) for initiating activities of the at least one industrial device and receiving data collected by the industrial device in response to the commands, wherein the industrial device MIMO transceiver is further configured to transmit the collected data to the control station.

Another exemplary embodiment of the present invention takes the form of a method of provisioning a private wireless communication network based upon the standard IEEE 802.11 protocol for a specific industrial application defined by a profile of a set of relevant operating parameters. The method includes: frequency-shifting a standard WiFi operating frequency band into a target band within the range of 100 MHz-100 GHz, the target band identified as preferred for the specific industrial application, decreasing the channel size from a standard 20/40/80/160 MHz size defined in IEEE 802.11 to a predetermined value sufficient to support a data throughput of the specific industrial application, and customizing the profile of the relevant operating parameters associated with the specific industrial application, the set of relevant operating parameters selected from the group of IEEE 802.11 parameters consisting of: latency, bi-directional control protocol, video transmission rate, transmission power, receiver sensitivity, network architecture, communication range, ACK timing window.

Other and further aspects and advantages of the present invention will become apparent during the course of the following discussion and by reference to the accompanying drawings.

BRIEF DESCRIPTION OF THE DRAWINGS

Referring now to the drawings.

DETAILED DESCRIPTION

The wireless, broadband WAN technology of the present invention leverages the state-of-the-art multiple-input-multiple-output (MIMO) performance of the ubiquitous Wi-Fi and extends its use into any desired frequency band, thus providing a cost-effective solution to implement private wireless networks for applications requiring reliability and high throughput in specific industrial environments (for example, reliable operation across a relatively long range (kms), or in a noisy location such as a warehouse with multiple sources of radio interference, etc.). This inventive wireless technology is referred to hereinafter as "Broadband for Industrial Internet", or simply BII.

Figure 2:
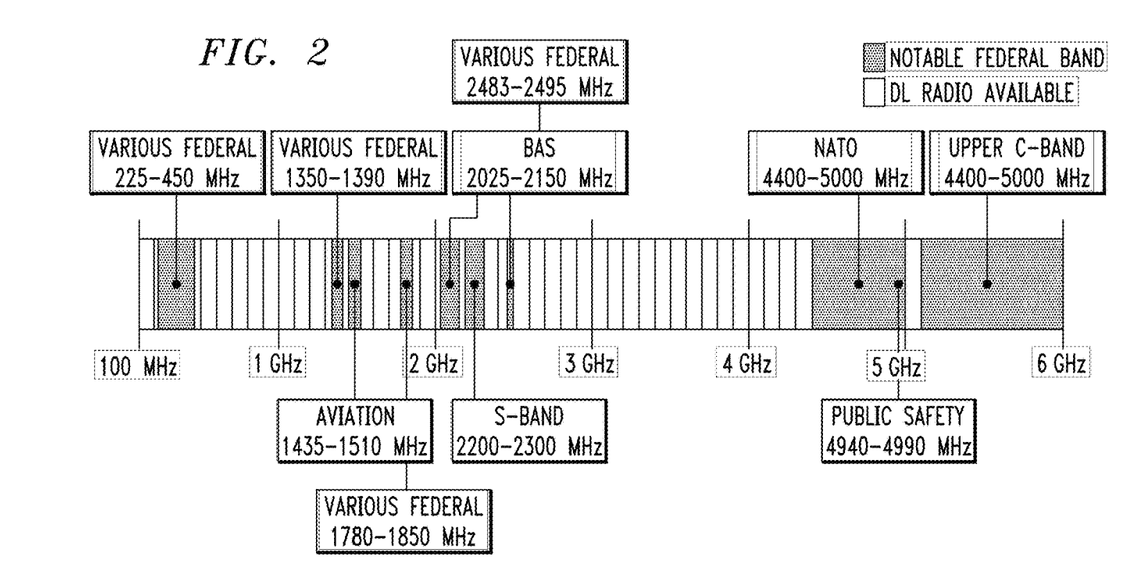
FIG. 2 illustrates a conventional prior art 2×2 MIMO architecture.

At its core, BII uses the same MIMO/COFDM technology as specified in the IEEE 802.11 standard for wireless communication. "MIMO", referring to "multiple input/multiple output", utilizes a single transmitter to send multiple wireless signals via multiple transmit antennas. An associated receiver also utilizes multiple antenna elements, where the combination allows for sending and receiving more than one data signal simultaneously over the same radio channel by exploiting multipath propagation. FIG. 2 illustrates a 2×2 MIMO configuration. Coupled with this multi-signal MIMO arrangement is the preferred use of coded orthogonal frequency division multiplexing (COFDM) as the encoding scheme for the wireless signals being transmitted in both directions. COFDM is a modulation scheme well-known for its ability to cope with high levels of multipath propagation and a variable delay between transmitter and receiver components, where the dynamic aspects of industrial wireless communication applications are well-served by using this type of encoding.

In accordance with the principles of the present invention, various physical and MAC layer parameters of the IEEE 802.11 standard are fine-tuned to achieve interference-resistant and robust wireless communication for a specific industrial application, while maintaining the MIMO physical topology and using COFDM modulation. In particular, the BII architecture of the present invention incorporates extensions for software-defined operating frequency band selection, channel sizes and center frequency. The BII waveform is capable of operating in any frequency band. This frequency flexibility allows the inventive methodology to be used in various countries, as well as deployed in any industry-specific frequency band. Moreover, the frequency agility available with band selections allows for the monitoring of transmission success rate and channel re-assignment in real time if too many failures are detected. The channel size can be adjusted by using downclocking techniques well known in the art, for example.

As IIoT applications have become more demanding, they require more sophisticated networking capabilities. Instead of attempting to utilize a single wireless networking solution, the BII approach of the present invention allows for the creation of an application-specific wireless communication configuration, using the software-defined parameters described below to create a function set best-suited for each application. In particular, these parameters include various combinations selected from: channel size, latency control, video streaming requirements, multi-frequency mesh networking, bi-directional protocol for communicating operating parameters, adjustments to the ACK timing window, transmit power adjustments, dynamic channel selection, automated test mode capabilities, and the like. When coupled with the ability to provide frequency shifting, band filtering, and channel filtering, these extensions to the core IEEE 802.11 capabilities as provided by the present invention allow for application-specific sets of parameters to be defined for different industrial applications. The following paragraphs provide additional detail regarding the parameters/extensions modified in accordance with the present invention to provide optimized wireless communication solutions for various industrial applications.

With regard to channel size, various downclocking/underclocking techniques may be used to create channel sizes as small as 1.25 MHz from the standard IEEE 802.11 20/40/80/160 MHz channel sizes (as mentioned later, the ability to define a flexible, small channel size opens up possibilities of implementing IIoT wireless communication networks in frequency bands previously not accessible). Inasmuch as various industrial applications for wireless communication networks have relatively "low" throughput requirements (e.g., data throughput on the order of 1-100 Mbps, as used for transmission of streaming video), the small channel size is sufficient (and is, indeed, more spectrum efficient than 'wasting' a significant portion of the bandwidth using standard channel sizes). The use of a small channel size thus results in more channels becoming available for use in a given band, reducing the chances for interference between channels and allowing for a network to support a larger number of industrial devices (i.e., "nodes"). Smaller channel sizes also provide increased receiver sensitivity and extended communication ranges. For example, a 1.25 MHz channel has a range of about 16 times longer than a "standard" WiFi channel size of 20 MHz. As mentioned above, the smaller channel size also opens the possibility of utilizing certain bands (such as the "TV white space", TVWS band, which has a maximum channel size of 6 MHz) that could not employ the standard larger-sized WiFi channels.

Figure 3:
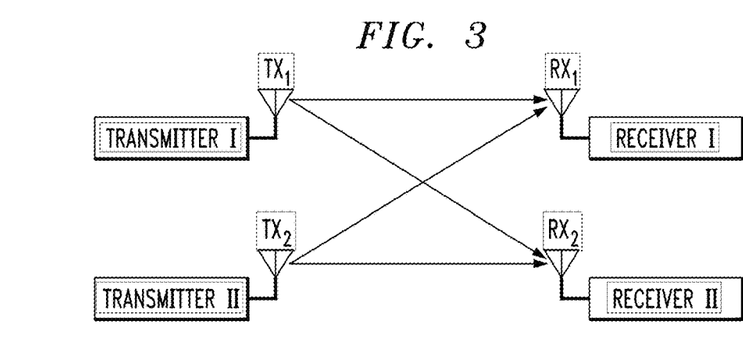
FIG. 3 shows an exemplary operating range of BII in accordance with the present invention, spanning 100 MHz to 100 GHz (for example), as permitted by the software-defined channel assignments and related parameters.

Indeed, a significant aspect of the present invention is that both the frequency band used for transmission and the flexible channel size of the selected band are software-defined elements. Our co-pending application Ser. No. 15/986,913 describes in detail an exemplary approach for providing frequency shifting, which is herein incorporated by reference. An application-specific waveform as configured by the BII system of the present invention can operate in any frequency band, for example between 100 MHz and 100 GHz, as shown in FIG. 3.

The channel size itself is software defined in further accordance with the present invention to have a value anywhere between 1.25 MHz (a narrow band not typically available) to a wide band of about 40 MHz (for example), the selection of channel size based upon a specific application's throughput requirements. The ability to define the channel size, coupled with auto-adjusting the bit coding rate, allows each application-specific implementation of the BII system to be spectrum efficient and operate at the maximum possible signal-to-noise ratio (SNR) for that application. As will be discussed below, some international markets only have small amounts of spectrum available. The ability to shrink the channel size opens up the possibility to create wireless communication configurations for IIoT applications in these markets.

As described in detail in our co-pending application, frequency shifting into other bands may be provided by using an external heterodyne mixer to shift a standard WiFi frequency into another (software-defined) band, often referred to as the "target band". Additional band filters may be included to avoid interference in the target band. Relatively long range is achieved by amplifying the transmit RF power and using a set of low noise amplifiers (LNAs) to compensate for receiver losses. The ability to maintain a communication link over relatively long distances (for example, several kilometers) is important for many IIoT applications in fields such as aviation, public safety, mining, farming, and the like.

By disabling certain frame/packet protocols, it has been found possible to significantly reduce the latency on selected communications in various industrial applications of the inventive BII architecture. For example, rapidly moving vehicles require reliable and low latency "command and control" communications from a control station overseeing the operations of the vehicles. In accordance with the present invention, the latency is significantly reduced over the prior art standards by understanding that various default WiFi settings are not optimum for the transmission of relatively short "command and control" messages, and thus disabling these settings reduces the transmitted message length. As a result, the uplink channel between the control station and each vehicle (node) is configured as an "Ultra Reliable Low Latency Channel" (URLLC) transmission channel by disabling one or more of the following link settings: software retries, hardware retries, frame aggregation, HT capabilities, specific MCS (and legacy) rates. As reliability is critical in most industrial applications, aspects of MIMO related to multipath transmission, forward error correction, and ACK-retransmits are readily available for this purpose.

The BII application-specific wireless communication system of the present invention implements a bi-directional protocol to exchange certain operational parameters between nodes in the mesh network. Advantageously, the frame packet as defined in the IEEE 802.11 includes a mechanism to include messages in the frame beacon. While so defined, these beacon messages are rarely used. Thus, by transmitting the software-defined information regarding the selected frequency-shifted band and the channel size of the selected band in this pre-existing capability, the BII system efficiently broadcasts its capabilities to other wireless nodes) that may communicate within a given IIoT application.

In particular, this BII "control protocol" is advantageous in shared spectrum applications as now being proposed by the FCC. In these situations, the FCC is releasing additional spectrum bands in certain licensed bands (e.g., the 3.5 GHz Citizen's Band Radio Service (CBRS) band and the sub-GHz TVWS band), thus "sharing" the frequency band between licensed and unlicensed users. In order for an entity to use these "shared" frequencies, it must first obtain authorization to communicate at a particular frequency (and with a specified maximum power) from a central database administered by the FCC. In accordance with the present invention, therefore, a control station may obtain authorization for an identified channel and transmit power, and thereafter communicate this information to all other nodes (i.e., industrial devices) in the network in an efficient manner.

Other parameters/extensions that may be modified for given industrial applications are associated with controlling the aspects of the communication itself. For example, it is contemplated that the "timing window" for the ACK transmission may be modified for industrial applications that operate in a "long range" environment. In conventional WiFi applications, the ACK timing window is configured to accommodate a transmission range of about 200 meters. Clearly, a 10-km range for selected industrial applications will require a significantly longer window and the system of the present invention allows for this timing window to be adjusted to ensure that the flight time of an ACK response from a remotely-located node is sufficient for it to reach the control station.

The nodes (industrial devices) in an exemplary application-specific private communication network of the present invention may be further configured to constantly monitor the received signal power (Received Signal Strength Indicator, RSSI) from neighboring nodes in the network, and send "power adjustment" commands as necessary. The nodes within close proximity to other nodes thus transmit "just enough" power to maintain good communication, improving network quality by reducing noise received by adjacent nodes. The control station may also be configured to scan across all available channels within the assigned frequency band and select a channel with the least interference, updating channel selection as the operating environment changes (with the channel updates being transmitted to all nodes in the network, as described above).

While not an exhaustive listing, exemplary types of IIoT systems that may benefit by using an application-specific wireless communication system formed in accordance with the present invention include aviation, defense, unmanned vehicles (aerial and/or terrestrial), public safety, energy systems (oil, gas or electricity), and "agriculture" (including mining and forestry). Each of these includes a set of requirements that are specific to that implementation and the ability to fine tune the physical and MAC layer parameters in accordance with the present invention thus provides an optimum solution for each case.

For example, providing wireless communications with unmanned aerial vehicles (UAVs, also referred to as drones) can take advantage of the typical clear "line of sight" (LOS), which thus exhibits only small amounts of multi-path reflections and may easily provide reliable communications using a small channel size. Since the ability to maintain communication over relatively long distances may be important, the small channel size (and perhaps an operating frequency that is shifted to a different band) of the inventive BII architecture extends the usable range between the base station and a given drone. Additionally, the uplink connection to the drone needs to be reliable with low latency; utilizing the URLLC capabilities described above are thus well-suited for this application.

In field operations (e.g., mining, energy, farming) that consist of multiple vehicles, equipment, and personnel disposed across rugged terrain, a communication system that provides constant, reliable connectivity is a priority. Here, configuring the BII system to prioritize high power, long-distance links takes precedence over other considerations.

As mentioned earlier, downclocking techniques can be used to adjust the COFDM channel size, with the bandwidth typically defined for a specific application's throughput requirements. The ability to define the channel size, coupled with auto-adjusting the COFDM bit rates, allows the inventive BII system to be spectrum efficient and operate at the maximum possible SNR. Indeed, these extensions open up many new possibilities, making BII a versatile wireless technology.

Figure 4:
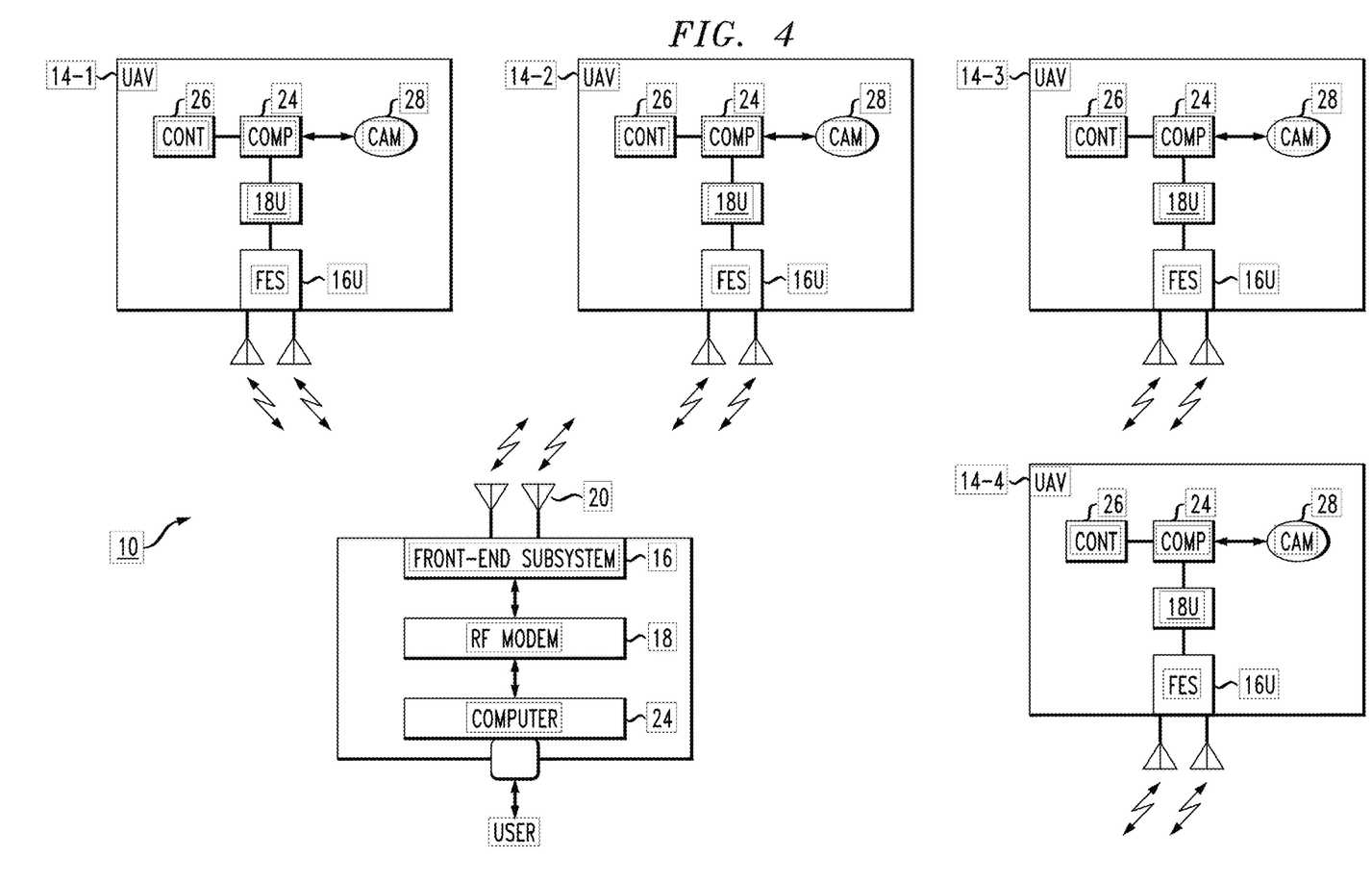
FIG. 4 is a block diagram of an exemplary application-specific BII system of the present invention, in this particular example particularly configured for industrial applications such as the control of unmanned aerial vehicles (UAVs/drones), based upon using a software-defined front end subsystem module to frequency shift the output of a standard radio frequency (RF) modem to another operating frequency band.

FIG. 4 is a block diagram of an exemplary implementation of a BII communication system 10 that has been specifically configured for an "unmanned aerial vehicle" (UAV) application. As described in detail below, this application consists of a "ground" control station 12 (or possibly, multiple control stations networked in a mesh topology) used to control the movement and operations of one or more UAVs 14 (such as drones), the UAVs also being referred to at times hereinafter as "industrial devices" or "nodes". Fueled by growing demand, UAV manufacturers are rapidly improving the performance of their systems in terms of range and capability. However, a problem remains in finding a communication waveform that allows these systems to maintain full functionality from long distances or in noisy environments. Items of importance to this application include, in no particular order, a relatively small size/weight and long-range communication capability in mostly a "near- LOS" (NrLOS) environment, as well as frequency agility, expansion capabilities, use of encryption, among others.

In the specific embodiment of the present invention as shown in FIG. 4, control station 12 is configured to utilize a front-end subsystem (FES) 16 that functions as the "application-specific" interface between a conventional RF modem 18 and antennas 20. In this example, FES 16 provides frequency band shifting (software defined) away from the conventional WiFi bands into an assigned band for this application. FES 16 also defines the associated channel size by using software-based techniques such as "downclocking". In operation, a system user is able to control the operation of a specific UAV 14 (for example, UAV 14-1) by entering commands via a communication interface 22 to a computer processing system 24 within control station 12.

For example, a user may want to have UAV 14-1 perform an inspection of power transmission lines at a utility substation. The user enters the appropriate command(s) for this operation, and identifies UAV 14-1 as the industrial device to perform the inspection. Computer processing system 24 recognizes the ID of UAV 14-1, and forwards the command(s) through RF modem 18 to FES 16. As mentioned above, FES 16 is configured by software to define the specific operating frequency and channel size selected for communicating with UAV 14-1, and the control command(s) from the user is/are then transmitted at the selected operating frequency to UAV 14-1 (transmitted as an RF signal wave via the included antenna arrangement). It is an aspect of this particular embodiment of the present invention that front-end subsystem 16 functions to perform the required frequency shifting and channel sizing (via software) to best communicate with UAV 14-1.

UAV 14-1 (as well as UAV 14-2 and other UAVs deployed within the exemplary industrial communication network) is shown as including a similar front-end subsystem 16U (operating at the same operating frequency band and using the same channel size) that functions to recover the command signal, which is thereafter interpreted by included computer processing unit 24U. Here, the "commands" may include items such as moving/redirecting UAV 14-1, as well as requesting UAV 14-1 to record a video stream. Computer processing unit 24U thus instructs an included device controller 26 to provide "flight control" of UAV 14-1 and an included camera 28 to record video of at the utility substation. The video is thereafter sent over the downlink channel created between UAV 14-1 and control station 12. It is to be understood that in general each UAV (or industrial devices in other applications) may include one or more peripherals in addition to (or instead of) a camera, where the peripherals may include different types of environmental sensors, or any element appropriate to collect information useful for the user/owner of the network.

This particular embodiment of the present invention allows for legacy WiFi networks to be converted into an application-specific BII system by incorporating the front-end subsystems at the output of the RF modem in the control station (where in conventional WiFi, the RF modem output is the actual signal transmitted across the network).

Most real-world UAV applications are far removed from "clean, interference-free, LOS environments". Instead, these UAV applications tend to be significant RF challenges due to constantly changing link conditions. For example, the effects of varying orientation, tilt-and-roll, multi-path reflections, antenna shadowing, and the like, may all dramatically change the link quality between the base station and each individual remote UE.

MIMO technology, one of the core parameters of the IEEE 802.11 standards mitigates these risks through a set of advanced features including, but not limited to, per-packet rate adaptation, RF power control, convolutional encoding, forward error correction, ACK retransmits, maximal ratio combining, spatial multiplexing, and space-time block coding. As discussed above in association with FIG. 2, the 2×2 MIMO architecture provides antenna diversity and, therefore, addresses dynamic link conditions caused by the roll and pitch of a UAV. The ability to use a small channel size optimizes the receiver. The high level of receiver sensitivity and SNR allows the system to handle interference and operate at long ranges.

Figure 5:
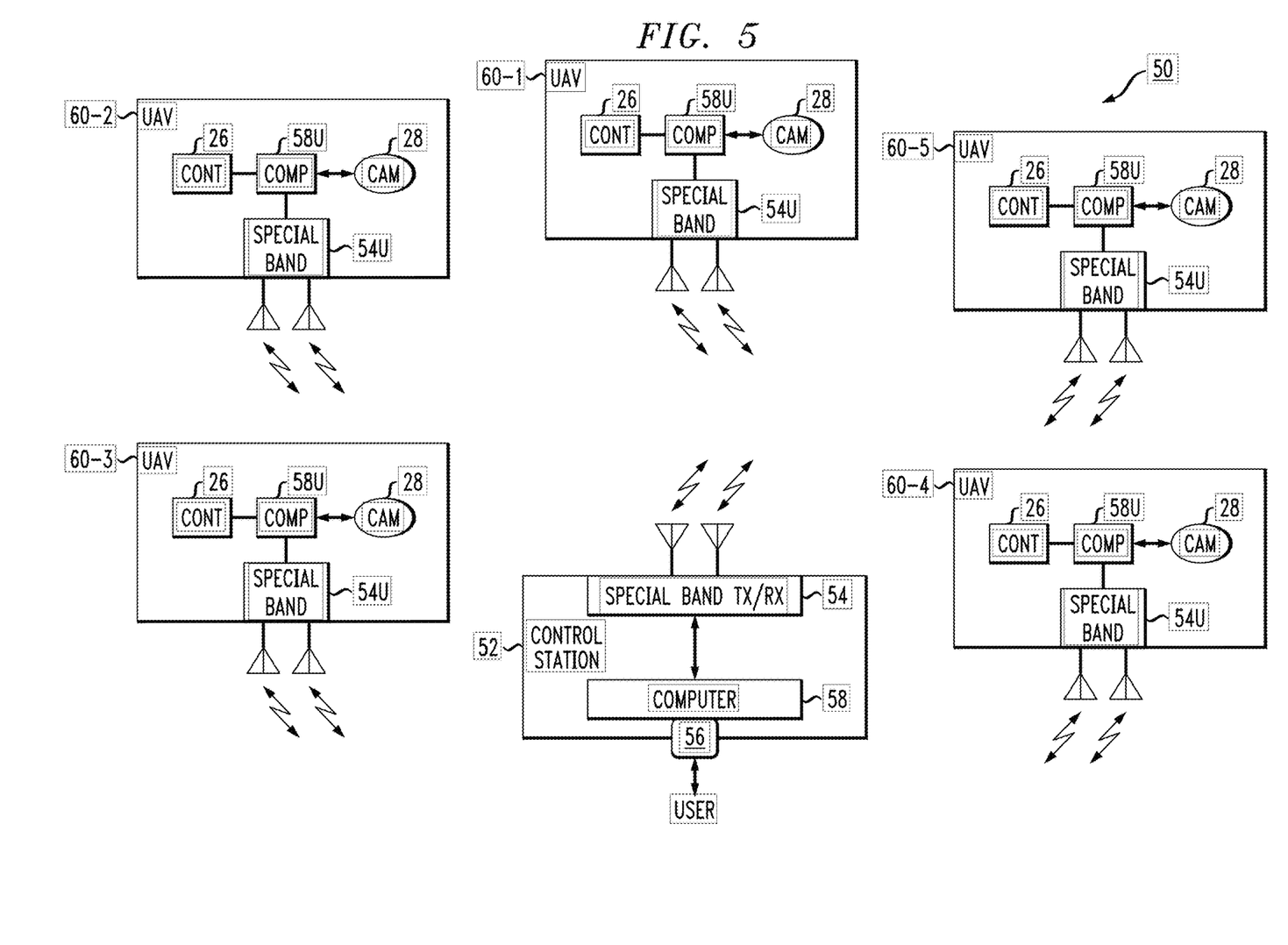
FIG. 5 is a block diagram of an alternative embodiment of an application-specific BII system, in this case using a computer-controlled "special band" transceiver to provide software-defined operating band frequency selection and channel size, utilizing MIMO and COFDM attributes of IEEE 802.11 to configure reliable connections between nodes in the system.

FIG. 5 illustrates an alternative embodiment of the present invention, where a BII wireless communication system 50 utilizes MIMO and COFDM capabilities to address these specific industrial challenges of the UAV application. In this embodiment, system 50 comprises a control station 52 that utilizes a "special band" transceiver 54 that provides software-defined operating frequency and software-defined channel size. Inputs to special band transceiver 54 in the form of user-supplied "command and control" signals are provided via a communication interface 56 to a computing system 58 of control station 52. Commands for a particular UAV 60 (for example, UAV 60-1 as shown in FIG. 5) recognized by computing system 58 and forwarded to special band transceiver 54. Special band transceiver 54 utilizes software controls to define the specific operating frequency band and channel size preferred for communicating with all of UAVs 60 within the network and thus functions to transmit the user command at the defined operating frequency to UAV 60-1 (transmitted as an RF signal wave via the included antenna arrangement). Each UAV 60 also includes a special band transceiver 54U, where the capability to use software-defined assignment of the proper operating frequency band and channel size provides reliable communication between the control station and each UAV. It is an aspect of this embodiment of the present invention that if the user of the communication network later determines to operate the network at a different frequency band, the special band transceivers 54U may simply be "swapped out" with another set of transceivers configured to operate at a different, defined frequency band, providing plug-and-play capability with this particular embodiment of the present invention.

Figure 6:
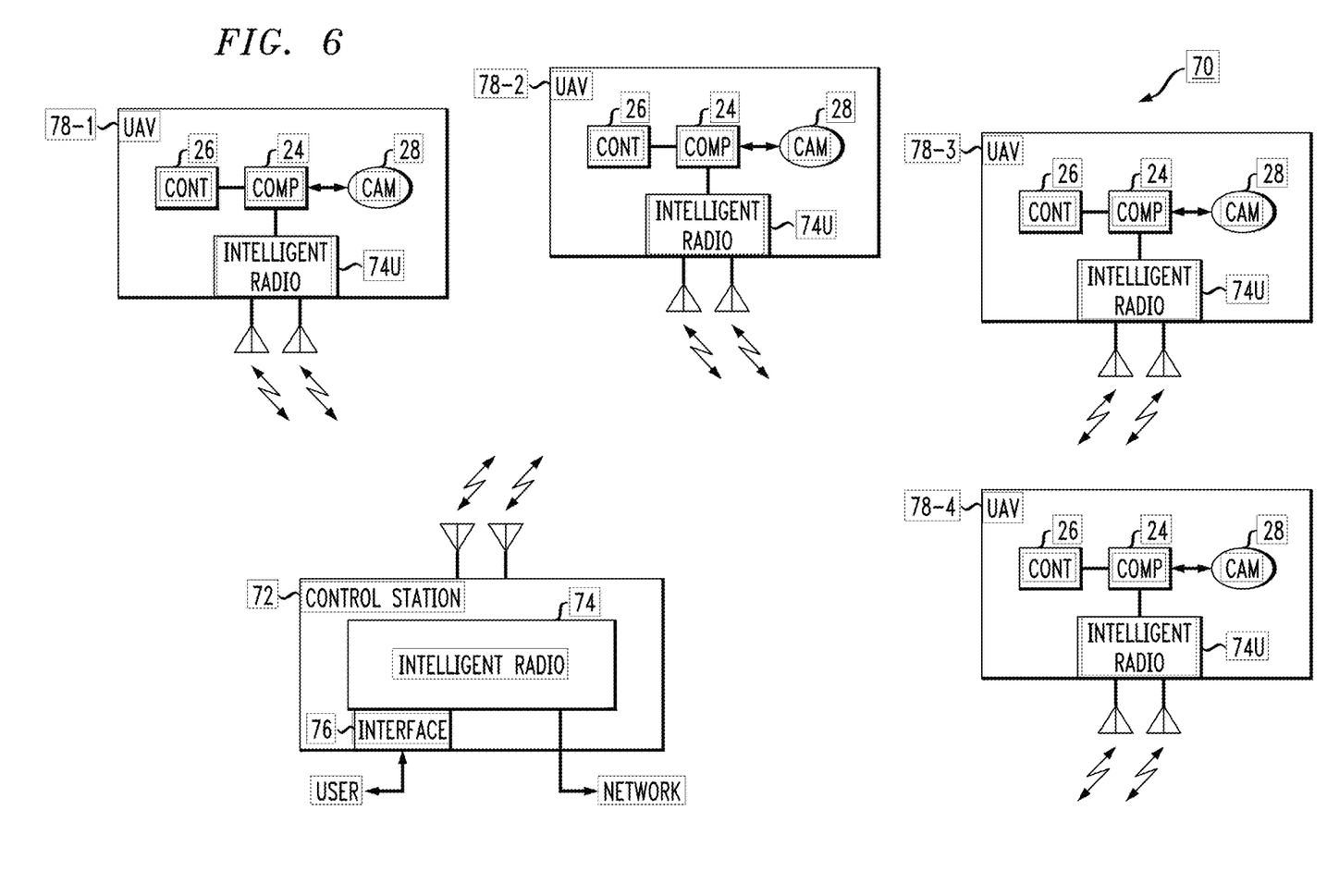
FIG. 6 is a block diagram of yet another embodiment of the present invention, in this case incorporating processing capabilities within a common module with a special band transceiver to create a fully integrated alternative.

Another priority for the UAV application is the ability minimize the size and weight of the communication system. Therefore, the ability to use a single "intelligent radio" on a UAV to handle all communication needs mitigates the complexity of implementations using multiple data links, as is currently required. FIG. 6 illustrates yet another embodiment of the present invention, where in this case a single radio component is included in both the control station and each UAV, providing bi-directional communication for effectively controlling the operation of the UAVs. Here, system 70 includes a control station 72 including an intelligent, programmable special band transceiver 74, controlled by a user through a communication interface 76. Each UAV 78 also includes an intelligent transceiver 74U, which is used to both receive command and control signals from control station 82 (via an uplink channel) and transmit collected data (i.e., sensor data, typically live stream video) on a downlink channel to control station 72. The uplink "command and control" to UAV 78 needs to be highly reliable with low latency (will typically use the BII system URLLC for this), providing communication at the highest priority level and enabling RF parameters that ensure reliable communication, even in very noisy environments.

The downlink from a given UAV 78 to control station 72 often carries large amounts of sensor data. Streaming 4K video requires about 20 Mbps throughput, while about 1 Mbps throughput is sufficient for low resolution video. An optimized streaming sensor channel can be used to transmit at these rates over long distances. In accordance with the principles of the present invention, one exemplary "optimized" channel is intentionally configured to limit the number of "retries" for failed packets. Standard WiFi transmission defaults to utilizing 30 retries for a failed packet. By reducing this number of retries to less than 5 (for example), or even as little as two retries has been found to achieve continuous streaming transmission over long distances. For the industrial applications of the present invention, it has been determined the occasional packet loss in video/sensor data transmission is not very critical and the benefit achieved for extending communication range more than compensates for the loss of an occasional packet.

The inventive BII technology may also implement the Automatic Transmit Power Control (ATPC) capability. Here, the transmitter polls the receiver to obtain an indication of the received signal strength. The transmitter is able to use this information to adjust its transmit power accordingly. As a result, "noise pollution" is avoided since the transmitter is using just enough power for proper communication. Advantageously, the ability to control the transmit power results in lowering the DC power consumption in situations where the transmitting device is communicating to nearby nodes and a relatively low transmitter power is sufficient. This feature is particularly useful in the UAV industrial application, where it is likely that one or more UAVs may be close to the base station at any given point in time. DC power conservation is important for drones, as the on-board battery power is limited.

While FIGS. 4-6 illustrate specific embodiments for a UAV application, it is to be understood that similar component configurations may be utilized for any other industrial application, with application-specific, software defined parameters relevant to the particular industrial application (where exemplary other industrial applications include unmanned ground vehicles (UGV), remotely-operated robots, security/surveillance, military, and the like.

Figures 7, 8:
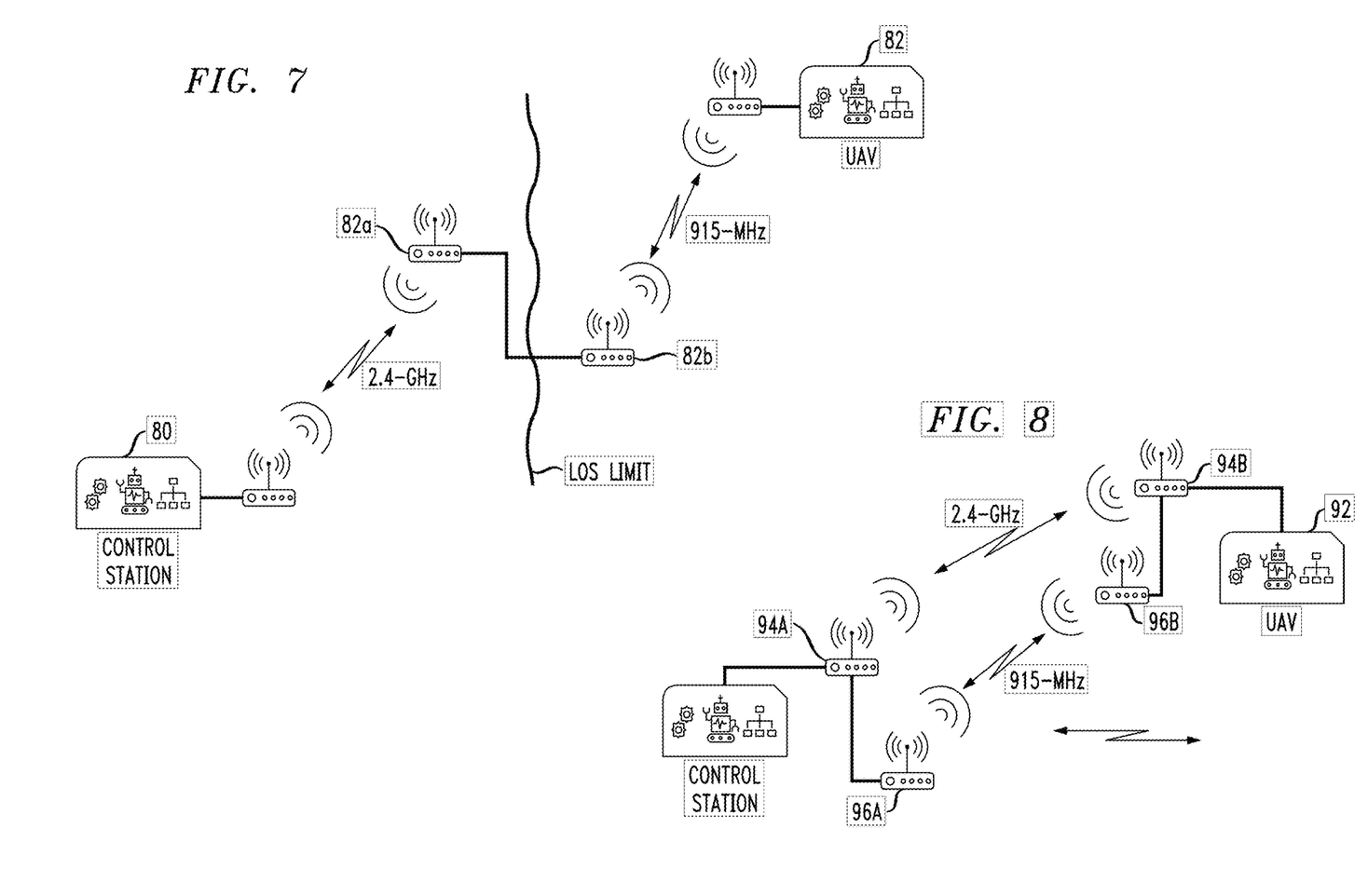
FIG. 7 is a simplified diagram illustrating the utilizing of hopping between nodes to extend the communication range of an exemplary application-specific private network formed in accordance with the present invention.
FIG. 8 is a simplified diagram illustrating the utilization of frequency diversity in the uplink and downlink channels between an exemplary control station and industrial device (e.g., unmanned vehicle, robotic device, or the like) as used within an application-specific communication network formed in accordance with the present invention.

The inventive BII system may be further provisioned to provide additional advantages in terms of specific industrial requirements of reliability, communication range, etc. In particular, permitting communication between nodes (as available in certain network topologies) further extends the communication range in a given industrial application that may otherwise have limited "line-of-sight" (LOS) capability. That is, by allowing a given transmission to hop from one network node (i.e., UAV) to the next, a control station will be able to communicate with a remotely-located industrial device (such as an unmanned vehicle), or a robotic device in a "noisy" manufacturing location. FIG. 7 is a simplified diagram illustrating this principle, where a control station 80 is attempting to transmit a command/control signal to UAV 82 (one identified node in the network). In this case, UAV 82 happens to be positioned beyond the LOS of control station 80. The illustrated network is shown as also including additional UAVs/nodes 82a and 82b, where node 82a is in relatively close proximity to control station 80. The command transmission destined for UAV 82 can therefore be "hopped" through nodes 82a and 82b, and be reliably recovered by UAV 82—which may be a quite a distance from control station 80.

Moreover, by use of software-defined frequency shifts and channel assignments in accordance with the principles of the present invention, the inventive BII system allows for individual nodes to communicate using different frequencies for uplink and downlink (with the capability to re-use frequencies for redundancy/self-healing purposes). The use of frequency diversity is known to further improve the network resiliency. FIG. 8 illustrates an application of frequency diversity in transmissions between a control station 90 and UAV (node) 92.

BII's MAC is fully compliant with the feature-rich IEEE 802.11 with its flat IP architecture. The MAC layer supports numerous advanced network features including, but not limited to, infrastructure, ad-hoc, and mesh modes of operation to implement various wireless network topologies. The MAC layer supports 256-bit AES encryption to address the concerns of wireless data security. Additionally, the MAC layer provides queues for multimedia traffic and QoS mechanisms to reduce latency for delay-sensitive applications.

As a result of the ability to shift frequency band (and channel size), BII can be adapted in accordance with the present invention to operate in, for example, the 900 MHz band (which in the United States ranges from 902 to 928 MHz). This particular frequency band is advantageous for many applications, since RF signals at 900 MHz have the ability to propagate further distances than their conventional Wi-Fi counterparts (operating at 2.4 GHz or 5 GHz). The 900 MHz band is referred to as an ISM band, which stands for "Industrial", "Scientific", and "Medical". The longer range is achieved via two different mechanisms: penetration and diffraction. "Penetration" refers to the ability of 900 MHz waves to penetrate through building walls, vegetation, and other obstacles. Indeed, signals operating at 900 MHz can propagate through multiple building walls, making this frequency band an excellent choice for applications that do not have a direct "line of sight" (LOS) between sender and receiver. "Diffraction" refers to the ability of 900 MHz waves to go around objects and other impediments to its direction of propagation. As a result of these transmission characteristics, broadband communication in the 900 MHz band is highly desirable to achieve a good balance of range, penetration and throughput.

The 900 MHz band is license-free in ITU's region 2 and a few other countries around the globe. In the United States, FCC Part 15 certified radios are permitted for unlicensed operation in this band. Thus, a private WBWAN implemented in this license-free band, by virtue of using the inventive BII technology, avoids the recurring monthly cost of a public cellular network.

By combining the capabilities of frequency shifting, defining/controlling channel size, and using beacon stuffing, the BII system of the present invention is able to bring the benefits of the state-of-the-art IEEE 802.11 technology to any one of the "shared spectrum bands" reserved for various industries, enabling broadband communication to be used in frequency bands where it has not been practical.

In the United States, some of these shared-spectrum bands, besides the above-described 900 MHz ISM band, include the 3.5 GHz CBRS band, federal bands, WMTS and MedRadio bands, broadcast auxiliary service and local TV transmission to upload news-gathering to TV stations, 4.4-5.0 GHz bands used by NATO, DoD, and the federal government.

Summarizing, key features of the inventive BII system that provide state-of-the-art RF performance include: long range and high throughput, availability across the 100 MHz- 100 GHz frequency range as shown in FIG. 3, interference-resistant COFDM/MIMO for improved link quality in difficult RF environments, exceptional multipath performance for NrLOS obstructions, adaptive radio modulations from BPSK up to 64QAM (with continuous per-packet optimization to maximize link performance in dynamic environments), flexible software-defined channel size for efficient spectrum re-use, software-defined operating frequency (and frequency shifting) for global applications, time division duplexing (TDD) for bi-directional traffic, MIMO features for robust data transmission, auto-channel selection to accommodate noisy spectrum problems, dynamic antenna diversity, and fast hand-off for mobile applications.

In terms of network performance, a BII wireless communication system formed in accordance with the principles of the present invention allows for the use of ultra-reliable low latency channel (URLLC) for "command and control", as well as an optimized video streaming channel over the same radio link, an end-to-end IP architecture for both unicast and multicast video traffic, 256-bit AES encryption for over-the-air data, multi-frequency mesh and ability to coordinate with the central frequency coordinator in shared frequency band operations.

What is claimed is:

1. A wireless communication system comprising
   a control station including
      a communication interface for interacting with a user;
      a multiple-input-multiple-output (MIMO) transceiver utilizing software-defined controls to provide an application-specific operating frequency band and an application-specific channel size selected for a particular industrial application, the MIMO transceiver further configured to modify selected operating parameters associated with standards defined by the Institute of Electrical and Electronics Engineers (IEEE) 802.11 series to optimize performance for the particular industrial application, a group of IEEE 802.11 series standards operating parameters available for modification including at least: transmission power, receiver sensitivity, network architecture, communication range, acknowledge LACK timing window; and
      a MIMO antenna configuration coupled to the MIMO transceiver; and
   at least one industrial device including
      a MIMO antenna configuration;
      a MIMO transceiver utilizing software-defined controls to match the characteristics of the control station MIMO transceiver;
      a processor responsive to signals received by the MIMO transceiver for determining commands associated with the industrial device; and
      a device controller, responsive to the processor, configured to generate instructions for initiating activities of the at least one industrial device and receiving data collected by the industrial device in response to the commands determined by the processor, wherein the industrial device MIMO transceiver is further configured to transmit the collected data to the control station.

2. The wireless communication system as defined in claim 1, wherein the group of IEEE 802.11 series standards operating parameters available for modification further includes: latency, bi-directional control protocol, and video transmission rate.

3. The wireless communication system as defined in claim 1, wherein at least one industrial device further comprises a peripheral component, responsive to instructions from the device controller, to capture requested data for transmission to the control station.

4. The wireless communication system as defined in claim 3 wherein the peripheral component comprises a video camera.

5. The wireless communication system as defined in claim 4 wherein the peripheral component comprises a plurality of sensors.

6. The wireless communication system as defined in claim 1 wherein the control station transceiver comprises a front-end subsystem coupled to a radio frequency (RF) modem, the front-end subsystem providing frequency band shifting of the RF modem output.

7. The wireless communication system as defined in claim 1 wherein the control station transceiver comprises a special band transceiver operating at a software-defined designated frequency band, the special band transceiver coupled to an associated processing device for providing software-defined channel size control of the designated frequency band.

8. The wireless communication system as defined in claim 1 wherein the control station transceiver comprises an integrated intelligent radio module including processing and transceiving functionality.

9. The wireless communication system as defined in claim 1 wherein the software-defined channel size is configured to be a selected value in the range of about 1.25 MHz to 40 MHz, a selection of channel size determined based upon the particular industrial application.

10. The wireless communication system as defined in claim 1 wherein the software-defined operating frequency band is selected from a group of special frequency bands including at least: 900 MHz ISM band, 3.5 GHz CBRS band, and TVWS band.

11. The wireless communication system as defined in claim 1 wherein the control station and the at least one industrial device are configured in a MIMO topology and utilize coded orthogonal frequency multiplexing (COFDM) encoding for signal transmission.

12. The wireless communication system as defined in claim 1 wherein the uplink channel between the control station and the at least one industrial device is configured as an ultra-reliable low latency channel (URLLC) channel to maintain low latency in the transmission of command-and-control signals.

13. The wireless communication system as defined in claim 12 wherein selected parameters of a frame configured under IEEE 802.11 series standards are disabled to achieve URLLC.

14. The wireless communication system as defined in claim 1 wherein the at least one industrial device comprises an unmanned vehicle.

15. The wireless communication system as defined in claim 1 wherein the at least one industrial device comprises a robotic device.

16. The wireless communication system as defined in claim 1 wherein the at least one industrial device comprises a plurality of industrial devices, all industrial devices operating within the same application-specific frequency band and using the same channel size.

17. A control station for providing communication with a plurality of industrial devices in a private wireless communication network via an application-specific operating frequency band and application-specific channel size, the control station comprising a communication interface for receiving command-and-control signals from a user for operating the plurality of industrial devices; and a transceiver utilizing a software-defined controls to tune transmission and reception to the application-specific operating frequency band and channel size, the transceiver including a transmission element for generating uplink command-and-control signals at the application specific operating frequency band and channel size, and a receiver element for recovering downlink operational data transmitted from the plurality of industrial vehicles; and an antenna module for broadcasting the generated uplink command-and-control signals and receiving the return downlink operational data signals.

18. An industrial device including communication and computing capabilities for being controlled within a wireless communication network by a control station, the industrial device comprising an antenna module for receiving uplink command-and-control signals from the control station;

a transceiver utilizing a software-defined communication frequency band and a software-defined channel size within the software-defined communication frequency band configured to operate at an application-specific operating frequency band and channel size defined by the control station, the transceiver coupled to the antenna module to recover uplink command-and-control signals transmitted by the control station;

a processor responsive to the recovered uplink command-and-control signals for determining operations to be performed by the industrial device; and a device controller, responsive to the processor and configured to generate instructions for initiating operational activities of the industrial device and receiving data collected by the industrial device, wherein the transceiver is further configured to utilize a downlink channel in the application-specific operating frequency band to transmit the collected data to the control station.

19. A method of provisioning a private wireless communication network based upon the standard IEEE 802.11 series protocol for a specific industrial application defined by a profile of a set of relevant operating parameters, the method including frequency-shifting a standard WiFi operating frequency band into a target band within the range of 100 MHz-100 GHz, the target band identified as preferred for the specific industrial application;

decreasing the channel size from a standard 20/40/80/160 MHz size defined in the IEEE 802.11 series protocol to a predetermined value sufficient to support a data throughput of the specific industrial application; and customizing the profile of the relevant operating parameters associated with the specific industrial application, the set of relevant operating parameters selected from the group of IEEE 802.11 series protocol parameters consisting of: latency, bi-directional control protocol, video transmission rate, transmission power, receiver sensitivity, network architecture, communication range, ACK timing window.

20. The method of claim 19 wherein the set of relevant operating parameters includes one or more of: latency, network architecture, and communication range, and the customizing step includes defining a required communication range to extend at least several km from a control station;

defining the network architecture as a mesh topology; and configuring a command and control channel at a control station as an ultra-reliable low latency channel (URLLC).

21. The method of claim 20 wherein configuring the URLLC includes disabling one or more of the following link settings: software retries, hardware retries, frame aggregation, and HT capabilities.

22. The method of claim 20 wherein the mesh topology of the network architecture is implemented as a multi-frequency mesh network for maintaining throughput in node-to-node transmission.

23. The method of claim 19 wherein the set of relevant operating parameters includes one or more of: video transmission rate, communication range, and ACK-retransmit, the customizing step comprising defining a required communication range to extend at least 20 km from a control station;

decreasing the number of video packet retries from the standard defined in the IEEE 802.11 series protocol to a value no greater than 3 to optimize video transmission rate; and extending the ACK timing window from the value defined in the IEEE 802.11 series protocol to a value appropriate for the defined communication range.

24. The method of claim 19, further comprising configuring a multiple-input-multiple-output (MIMO) transceiver at a control station to operate at the frequency-shifted frequency band and utilize the predetermined center frequency and channel size for communicating signals created using a coded orthogonal frequency division multiplexing (COFDM) modulation scheme, the configuring performed by using software-defined techniques to modify the standard IEEE 802.11 series protocol operating parameters; and configuring a plurality of industrial devices in networked communication with the control station to operating at the frequency-shifted frequency band and utilize the predetermined center frequency and channel size.

* * * * *